United States Patent
Fitzpatrick et al.

(10) Patent No.: US 7,283,963 B1
(45) Date of Patent: *Oct. 16, 2007

(54) SYSTEM, METHOD AND COMPUTER PROGRAM PRODUCT FOR TRANSFERRING UNREGISTERED CALLERS TO A REGISTRATION PROCESS

(75) Inventors: John E. Fitzpatrick, Sunnyvale, CA (US); Monica E. Smith, Mountain View, CA (US)

(73) Assignee: BeVocal, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/270,712

(22) Filed: Nov. 8, 2005

Related U.S. Application Data

(63) Continuation of application No. 09/802,394, filed on Mar. 9, 2001, now Pat. No. 7,016,843.

(51) Int. Cl.
*G10L 17/00* (2006.01)

(52) U.S. Cl. .................... 704/270.1; 379/88.1
(58) Field of Classification Search ............ 704/270.1; 379/88.1
See application file for complete search history.

(56) References Cited

U.S. PATENT DOCUMENTS 7,016,843 B2 * 3/2006 Fitzpatrick et al. ...... 704/270.1

* cited by examiner

*Primary Examiner*—Susan McFadden
(74) *Attorney, Agent, or Firm*—Zilka-Kotab, PC

(57) ABSTRACT

A system, method and computer program product are provided for handling unregistered callers in a voice recognition framework. Initially, it is determined whether a user is registered. If it is determined that the user is not registered, a registration process is executed. Once registered, utterances may be received from the user and recognized for the purpose of providing a service to the user.

17 Claims, 5 Drawing Sheets

SYSTEM, METHOD AND COMPUTER PROGRAM PRODUCT FOR TRANSFERRING UNREGISTERED CALLERS TO A REGISTRATION PROCESS

This is a continuation of application Ser. No. 09/802,394 filed on Mar. 9, 2001 now U.S. Pat. No. 7,016,843

FIELD OF THE INVENTION

The present invention relates to speech recognition systems, and more particularly to providing services using speech recognition.

BACKGROUND OF THE INVENTION

Techniques for accomplishing automatic speech recognition (ASR) are well known. Among known ASR techniques are those that use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

ASR systems have greatly improved in recent years as better algorithms and acoustic models are developed, and as more computer power can be brought to bear on the task. An ASR system running on an inexpensive home or office computer with a good microphone can take free-form dictation, as long as it has been pre-trained for the speaker's voice. Over the phone, and with no speaker training, a speech recognition system needs to be given a set of speech grammars that tell it what words and phrases it should expect. With these constraints a surprisingly large set possible utterances can be recognized (e.g., a particular mutual fund name out of thousands). Recognition over mobile phones in noisy environments does require more tightly pruned and carefully crafted speech grammars, however. Today there are many commercial uses of ASR in dozens of languages, and in areas as disparate as voice portals, finance, banking, telecommunications, and brokerages.

Advances are also being made in speech synthesis, or text-to-speech (TTS). Many of today's TTS systems still sound like "robots", and can be hard to listen to or even at times incomprehensible. However, waveform concatenation speech synthesis is now being deployed. In this technique, speech is not completely generated from scratch, but is assembled from libraries of pre-recorded waveforms. The results are promising.

In a standard speech recognition/synthesis system, a database of utterances is maintained for administering a predetermined service. In one example of operation, a user may utilize a telecommunication network to communicate utterances to the system. In response to such communication, the utterances are recognized utilizing speech recognition, and processing takes place utilizing the recognized utterances. Thereafter, synthesized speech is outputted in accordance with the processing. In one particular application, a user may verbally communicate a street address to the speech recognition system, and driving directions may be returned utilizing synthesized speech.

Problems may exist when administrating a speech recognition/synthesis system such as the one set forth hereinabove. For example, a user may call and request a service that requires more information associated with the user before the service can be delivered. For example, a service may require payment. Therefore, in certain situations, there may be a need for information, i.e. billing address, credit card number, etc., before the service can be rendered.

DISCLOSURE OF THE INVENTION

A system, method and computer program product are provided for handling unregistered callers in a voice recognition framework. Initially, it is determined whether a user is registered. If it is determined that the user is not registered, a registration process is executed. Once registered, utterances may be received from the user and recognized for the purpose of providing a service to the user.

In one embodiment of the present invention, the registration process may include the collection of information. As an option, the information may include at least one phone number of the user, a gender of the user, billing information, an address of the user, a city in which the user resides, and/or preferences of the user. In one aspect of the present invention, the preferences may include, personalization information, data relating to a stock portfolio of the user, and sports of interest to the user.

In another embodiment of the present invention, the information may be entered by the user utilizing a computer coupled to a network, i.e. the Internet. In another embodiment, the information may be entered verbally utilizing a telephone. In still another embodiment, the information may be entered verbally by way of an attendant.

It should be noted that the information may be used when providing the service by modifying, enhancing, etc. the same. As an option, promotion information may be provided to the user during the registration process.

DESCRIPTION OF THE PREFERRED EMBODIMENTS

Figure 1:
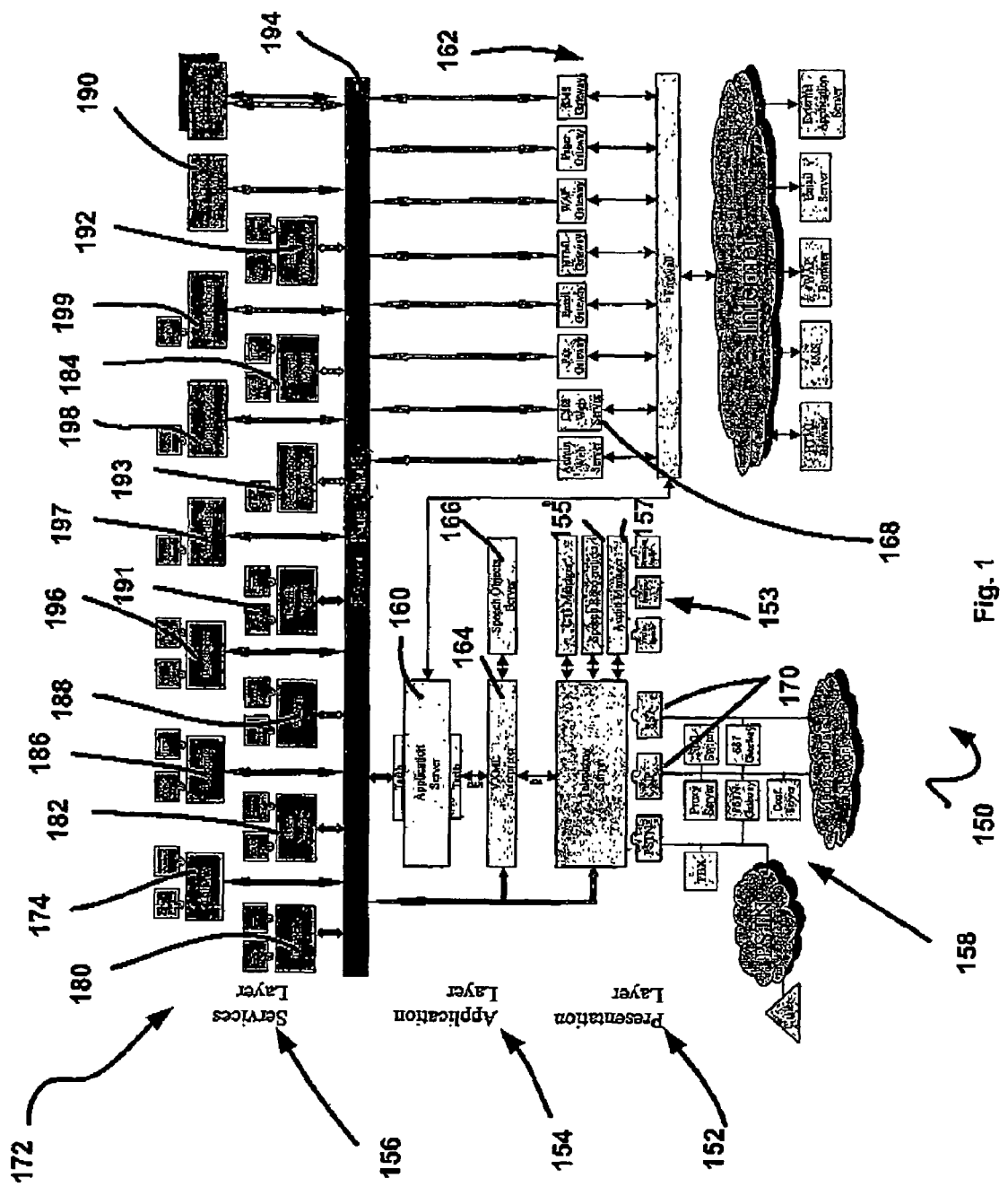
FIG. 1 illustrates one exemplary platform on which one embodiment of the present invention may be implemented.

FIG. 1 illustrates one exemplary platform 150 on which the present invention may be implemented. The present platform 150 is capable of supporting voice applications that provide unique business services. Such voice applications may be adapted for consumer services or internal applications for employee productivity.

The present platform of FIG. 1 provides an end-to-end solution that manages a presentation layer 152, application logic 154, information access services 156, and telecom infrastructure 159. With the instant platform, customers can build complex voice applications through a suite of customized applications and a rich development tool set on an application server 160. The present platform 150 is capable of deploying applications in a reliable, scalable manner, and maintaining the entire system through monitoring tools.

The present platform 150 is multi-modal in that it facilitates information delivery via multiple mechanisms 162, i.e. Voice, Wireless Application Protocol (WAP), Hypertext Mark-up Language (HTML), Facsimile, Electronic Mail, Pager, and Short Message Service (SMS). It further includes a VoiceXML interpreter 164 that is fully compliant with the VoiceXML 1.0 specification, written entirely in Java®, and supports Nuance® SpeechObjects 166.

Yet another feature of the present platform 150 is its modular architecture, enabling "plug-and-play" capabilities. Still yet, the instant platform 150 is extensible in that developers can create their own custom services to extend the platform 150. For further versatility, Java® based components are supported that enable rapid development, reliability, and portability. Another web server 168 supports a web-based development environment that provides a comprehensive set of tools and resources which developers may need to create their own innovative speech applications.

Support for SIP and SS7 (Signaling System 7) is also provided. Backend Services 172 are also included that provide value added functionality such as content management 180 and user profile management 182. Still yet, there is support for external billing engines 174 and integration of leading edge technologies from Nuance®, Oracle®, Cisco®, Natural Microsystems®, and Sun Microsystems®.

More information will now be set forth regarding the application layer 154, presentation layer 152, and services layer 156.

Application Layer (154)

The application layer 154 provides a set of reusable application components as well as the software engine for their execution. Through this layer, applications benefit from a reliable, scalable, and high performing operating environment. The application server 160 automatically handles lower level details such as system management, communications, monitoring, scheduling, logging, and load balancing. Some optional features associated with each of the various components of the application layer 154 will now be set forth.

Application Server (160)
  A high performance web/JSP server that hosts the business and presentation logic of applications.
  High performance, load balanced, with failover.
  Contains reusable application components and ready to use applications.
  Hosts Java Servlets and JSP's for custom applications.
  Provides easy to use taglib access to platform services.

VXML Interpreter (164)
  Executes VXML applications
  VXML 1.0 compliant
  Can execute applications hosted on either side of the firewall.
  Extensions for easy access to system services such as billing.
  Extensible—allows installation of custom VXML tag libraries and speech objects.
  Provides access to SpeechObjects 166 from VXML.
  Integrated with debugging and monitoring tools.
  Written in Java®.

Speech Objects Server (166)
  Hosts SpeechObjects based components.
  Provides a platform for running SpeechObjects based applications.
  Contains a rich library of reusable SpeechObjects.

Services Layer (156)

The services layer 156 simplifies the development of voice applications by providing access to modular value-added services. These backend modules deliver a complete set of functionality, and handle low level processing such as error checking. Examples of services include the content 180, user profile 182, billing 174, and portal management 184 services. By this design, developers can create high performing, enterprise applications without complex programming. Some optional features associated with each of the various components of the services layer 156 will now be set forth.

Content (180)
  Manages content feeds and databases such as weather reports, stock quotes, and sports.
  Ensures content is received and processed appropriately.
  Provides content only upon authenticated request.
  Communicates with logging service 186 to track content usage for auditing purposes.
  Supports multiple, redundant content feeds with automatic failover.
  Sends alarms through alarm service 188.

User Profile (182)
  Manages user database
  Can connect to a $3^{rd}$ party user database 190. For example, if a customer wants to leverage his/her own user database, this service will manage the connection to the external user database.
  Provides user information upon authenticated request.

Alarm (188)
  Provides a simple, uniform way for system components to report a wide variety of alarms.
  Allows for notification (Simply Network Management Protocol (SNMP), telephone, electronic mail, pager, facsimile, SMS, WAP push, etc.) based on alarm conditions.
  Allows for alarm management (assignment, status tracking, etc) and integration with trouble ticketing and/or helpdesk systems.
  Allows for integration of alarms into customer premise environments.

Configuration Management (191)
  Maintains the configuration of the entire system.

Performance Monitor (193)
  Provides real time monitoring of entire system such as number of simultaneous users per customer, number of users in a given application, and the uptime of the system.
  Enables customers to determine performance of system at any instance.

Portal Management (184)
  The portal management service 184 maintains information on the configuration of each voice portal and enables customers to electronically administer their voice portal through the administration web site.
  Portals can be highly customized by choosing from multiple applications and voices. For example, a customer can configure different packages of applications i.e. a basic package consisting of 3 applications for $4.95, a deluxe package consisting of 10 applications for $9.95, and premium package consisting of any 20 applications for $14.95.

Instant Messenger (192)

Detects when users are "on-line" and can pass messages such as new voicemails and e-mails to these users.

Billing (174)

Provides billing infrastructure such as capturing and processing billable events, rating, and interfaces to external billing systems.

Logging (186)

Logs all events sent over the JMS bus 194. Examples include User A of Company ABC accessed Stock Quotes, application server 160 requested driving directions from content service 180, etc.

Location (196)

Provides geographic location of caller.

Location service sends a request to the wireless carrier or to a location network service provider such as TimesThree® or US Wireless. The network provider responds with the geographic location (accurate within 75 meters) of the cell phone caller.

Advertising (197)

Administers the insertion of advertisements within each call. The advertising service can deliver targeted ads based on user profile information.

Interfaces to external advertising services such as Wyndwire® are provided.

Transactions (198)

Provides transaction infrastructure such as shopping cart, tax and shipping calculations, and interfaces to external payment systems.

Notification (199)

Provides external and internal notifications based on a timer or on external events such as stock price movements. For example, a user can request that he/she receive a telephone call every day at 8 AM.

Services can request that they receive a notification to perform an action at a pre-determined time. For example, the content service 180 can request that it receive an instruction every night to archive old content.

3$^{rd}$ Party Service Adapter (190)

Enables 3$^{rd}$ parties to develop and use their own external services. For instance, if a customer wants to leverage a proprietary system, the 3$^{rd}$ party service adapter can enable it as a service that is available to applications.

Presentation Layer (152)

The presentation layer 152 provides the mechanism for communicating with the end user. While the application layer 154 manages the application logic, the presentation layer 152 translates the core logic into a medium that a user's device can understand. Thus, the presentation layer 152 enables multi-modal support. For instance, end users can interact with the platform through a telephone, WAP session, HTML session, pager, SMS, facsimile, and electronic mail. Furthermore, as new "touchpoints" emerge, additional modules can seamlessly be integrated into the presentation layer 152 to support them.

Telephony Server (158)

The telephony server 158 provides the interface between the telephony world, both Voice over Internet Protocol (VoIP) and Public Switched Telephone Network (PSTN), and the applications running on the platform. It also provides the interface to speech recognition and synthesis engines 153. Through the telephony server 158, one can interface to other 3$^{rd}$ party application servers 190 such as unified messaging and conferencing server. The telephony server 158 connects to the telephony switches and "handles" the phone call.

Features of the telephony server 158 include:

Mission critical reliability.

Suite of operations and maintenance tools.

Telephony connectivity via ISDN/T1/E1, SIP and SS7 protocols.

DSP-based telephony boards offload the host, providing real-time echo cancellation, DTMF & call progress detection, and audio compression/decompression.

Speech Recognition Server (155)

The speech recognition server 155 performs speech recognition on real time voice streams from the telephony server 158. The speech recognition server 155 may support the following features:

Carrier grade scalability & reliability

Large vocabulary size

Industry leading speaker independent recognition accuracy

Recognition enhancements for wireless and hands free callers

Dynamic grammar support—grammars can be added during run time.

Multi-language support

Barge in—enables users to interrupt voice applications. For example, if a user hears "Please say a name of a football team that you," the user can interject by saying "Miami Dolphins" before the system finishes.

Speech objects provide easy to use reusable components

"On the fly" grammar updates

Speaker verification

Audio Manager (157)

Manages the prompt server, text-to-speech server, and streaming audio.

Prompt Server (153)

The Prompt server is responsible for caching and managing pre-recorded audio files for a pool of telephony servers.

Text-to-Speech Server (153)

When pre-recorded prompts are unavailable, the text-to-speech server is responsible for transforming text input into audio output that can be streamed to callers on the telephony server 158. The use of the TTS server offloads the telephony server 158 and allows pools of TTS resources to be shared across several telephony servers. Features include:

Support for industry leading technologies such as SpeechWorks® Speechify® and L&H RealSpeak®.

Standard Application Program Interface (API) for integration of other TTS engines.

Streaming Audio

The streaming audio server enables static and dynamic audio files to be played to the caller. For instance, a one minute audio news feed would be handled by the streaming audio server.

Support for standard static file formats such as WAV and MP3

Support for streaming (dynamic) file formats such as Real Audio® and Windows® Media®.

PSTN Connectivity

Support for standard telephony protocols like ISDN, E&M WinkStart®, and various flavors of E1 allow the telephony server 158 to connect to a PBX or local central office.

SIP Connectivity

The platform supports telephony signaling via the Session Initiation Protocol (SIP). The SIP signaling is independent of the audio stream, which is typically provided as a G.711 RTP stream. The use of a SIP enabled network can be used to provide many powerful features including:

Flexible call routing

Call forwarding

Blind & supervised transfers

Location/presence services

Interoperable with SIP compliant devices such as soft switches

Direct connectivity to SIP enabled carriers and networks

Connection to SS7 and standard telephony networks (via gateways)

Admin Web Server

Serves as the primary interface for customers.

Enables portal management services and provides billing and simple reporting information. It also permits customers to enter problem ticket orders, modify application content such as advertisements, and perform other value added functions.

Consists of a website with backend logic tied to the services and application layers. Access to the site is limited to those with a valid user id and password and to those coming from a registered IP address. Once logged in, customers are presented with a homepage that provides access to all available customer resources.

Other (168)

Web-based development environment that provides all the tools and resources developers need to create their own speech applications.

Provides a VoiceXML Interpreter that is:

Compliant with the VoiceXML 1.0 specification.

Compatible with compelling, location-relevant SpeechObjects—including grammars for nationwide US street addresses.

Provides unique tools that are critical to speech application development such as a vocal player. The vocal player addresses usability testing by giving developers convenient access to audio files of real user interactions with their speech applications. This provides an invaluable feedback loop for improving dialogue design.

WAP, HTML, SMS, Email, Pager, and Fax Gateways

Provide access to external browsing devices.

Manage (establish, maintain, and terminate) connections to external browsing and output devices.

Encapsulate the details of communicating with external device.

Support both input and output on media where appropriate. For instance, both input from and output to WAP devices.

Reliably deliver content and notifications.

Figure 2:
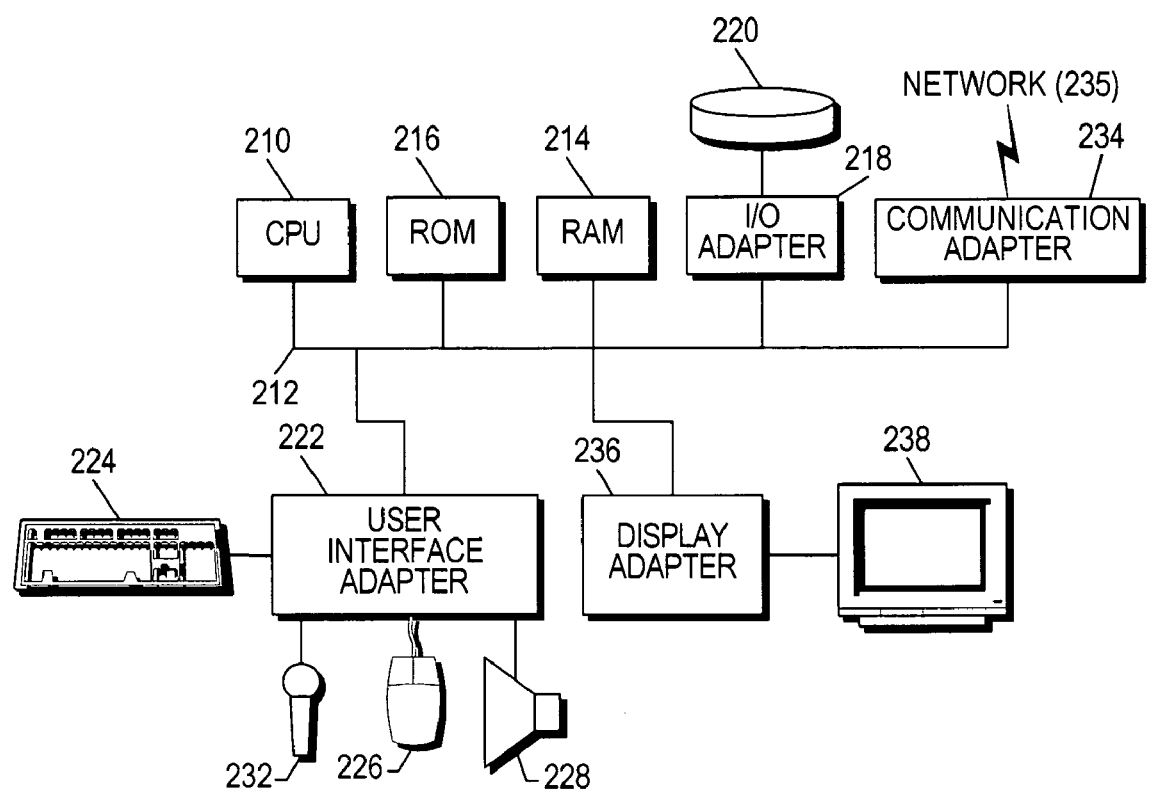
FIG. 2 shows a representative hardware environment associated with the computer systems of FIG. 1.

FIG. 2 shows a representative hardware environment associated with the various systems, i.e. computers, servers, etc., of FIG. 1. FIG. 2 illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Figure 3:
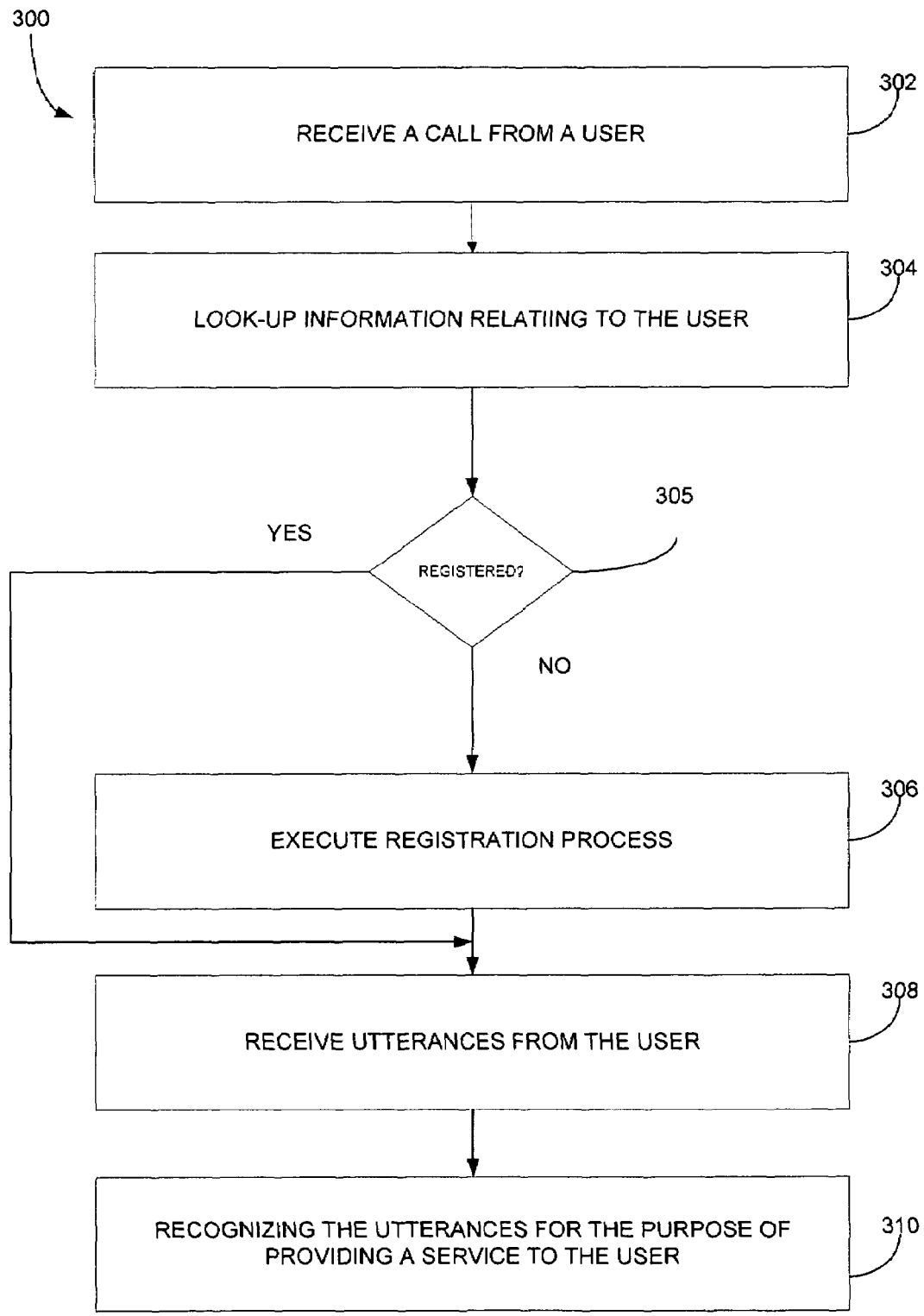
FIG. 3 illustrates a method for handling unregistered callers in a voice recognition framework.

FIG. 3 illustrates a method 300 for handling unregistered callers in a voice recognition framework. The present method may be carried utilizing the platform 150 and hardware set forth in FIGS. 1 and 2, and/or any other desired architecture.

Initially, in operation 302, a call is received from a user who wishes to obtain the service(s) offered by the voice recognition system. More information regarding various examples of such services will be set forth hereinafter in greater detail. Information relating to the user is then looked-up in a database, as indicated in operation 304. As an option, call description records (CDRs) may be used to access the information. For example, a CDR may be used to identify the caller by name, phone number, etc. To this end, such identification may, in turn, be used to look-up further information the database. In the alternative, the information may refer to only the data stored in the CDR. CDRs traditionally provide a record of called numbers, and a date, time, length and so on of each telephone call.

From the information gathered in operation 304, it is determined whether a user is registered in decision 305. To accomplish this, the information gathered in operation 304 may be compared against a database of registered users, or by way of any other desired technique. If it is determined that the user is not registered, a registration process is executed in operation 306. Additional descriptions regarding such registration process will be set forth in greater detail during reference to FIG. 4.

Once registered, utterances may be received from the user and recognized for the purpose of providing a service to the user. Note operation 308. In use, the information retrieved in operation 304 and the registration process of operation 306 may be used when providing the service by modifying, enhancing, etc. the same. This may allow the personalization of the services and/or facilitating additional capabilities.

Examples of the various services that may be provided in operation 306 will now be set forth. It should be noted that any services may be afforded per the desires of the user.

The speech recognition system of the present invention may provide a plurality of voice portal applications that can be personalized based on a caller's location, delivered to any device and customized via an open development platform. Examples of various specific voice portal applications are set forth in Table 1.

TABLE 1

Figure 4:
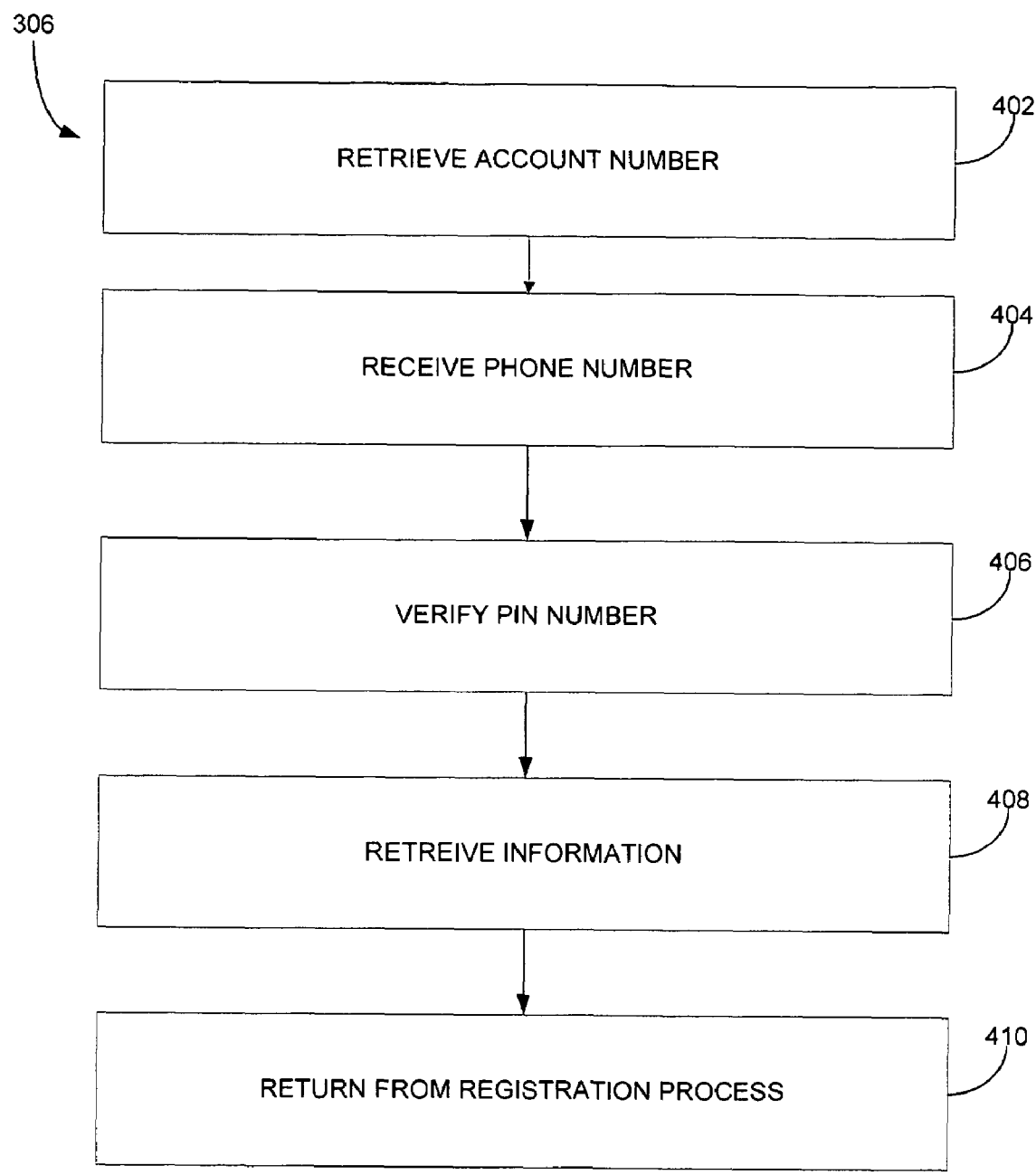
FIG. 4 is a flow chart illustrating the method for registering a user, in accordance with the process of FIG. 3.

Nationwide Business Finder - search engine for locating businesses representing popular brands demanded by mobile consumers.
Nationwide Driving Directions - point-to-point driving directions
Worldwide Flight Information - up-to-the-minute flight information on major domestic and international carriers
Nationwide Traffic Updates - real-time traffic information for metropolitan areas
Worldwide Weather - updates and extended forecasts throughout the world
News - audio feeds providing the latest national and world headlines, as well as regular updates for business, technology, finance, sports, health and entertainment news
Sports - up-to-the-minute scores and highlights from the NFL, Major League Baseball, NHL, NBA, college football, basketball, hockey, tennis, auto racing, golf, soccer and boxing
Stock Quotes - access to major indices and all stocks on the NYSE, NASDAQ, and AMEX exchanges
Infotainment - updates on soap operas, television dramas, lottery numbers and horoscopes FIG. 4 is a flow chart illustrating the method for registering a user, in accordance with operation 306 of FIG. 3. Prior to the registration process beginning, directions may be given to the user explaining the registration process and the method by which the user may exit the same.

As shown in operation 402, an account number is received. Such account number may identify the telecommunication carrier from which the user was transferred to the registration process. The account number may identify a "1-800" number, or any other phone from which the user was transferred.

As an option, a different type of unique user account number may be established for the user in order to facilitate future access to the speech recognition system. Such account number may be used during future transactions for allowing the user to access the speech recognition system of the present invention. Moreover, the account number may be used for storing and tracking various information relating to the user for a more personalized experience.

Further, in operation 404, at least one phone number of the user is retrieved and stored for reference purposes. In an ideal embodiment, multiple numbers are retrieved and stored, i.e. cellular phone number, facsimile number, electronic mail address, etc.

Still yet, a personal identification number (PIN) may be established and verified in operation 406. Such step is important for security purposes when the user accesses the present invention in future instances.

Thereafter, various information may be collected in operation 408 of FIG. 4. As mentioned earlier, the information retrieved during the registration process 306 may be used when providing the service by modifying, enhancing, etc. the same.

In one embodiment of the present invention, the registration process collects information including a gender of the user, an address of the user, birthday, a city in which the user resides, and/or any other type general purpose data. Still yet, billing information may be received including a billing address and a method of payment, i.e. credit card number, etc. As an option, preferences of the user may be collected. In one embodiment of the present invention, the preferences may include, personalization information, data relating to a stock portfolio of the user, and/or sports of interest to the user.

It should be understood that the information may be entered by the user utilizing any one or more of various possible methods. For example, a computer coupled to a network, i.e. the Internet, similar to that shown in FIGS. 1 and 2 may be used. In such embodiment, a user interface on the computer may be used while the user is on the telephone. Such user interface may take the form of a web-page or the like. Of course, the registration process need not necessarily occur simultaneously with the process of FIG. 3.

In another embodiment, the information may be entered entirely verbally utilizing an automated telephone attendant system. In still another embodiment, the information may be entered verbally in real-time by way of a live attendant.

As yet another option, promotion information may be provided to the user during the registration process. For example, various promotions associated with the services provided by the speech recognition system may be offered to the user. In particular, coupons may be distributed, etc. After the registration process is complete, the present embodiment is capable of returning the user to a main menu in order to allow the user to obtain any desired service. Note operation 410.

The manner in which the user is returned from the registration process may vary from embodiment to embodiment. By way of example, one embodiment may monitor key words provided verbally by the user. Upon the receipt and detection of such key words, the user may be returned from the process. As an option, the present embodiment may monitor for such key words throughout the entire registration process, and return the user immediately upon receipt of the keyword.

One embodiment of the present invention may utilize VoiceXML. VoiceXML is a Web-based markup language for representing human-computer dialogs, similar to HTML. However, while HTML assumes a graphical web browser, with display, keyboard, and mouse, VoiceXML is assumes a "voice browser" with audio output (computer-synthesized and/or recorded), and audio input (voice and/or keypad tones). VoiceXML leverages the Internet for voice application development and delivery, greatly simplifying these difficult tasks and creating new opportunities.

Figure 5:
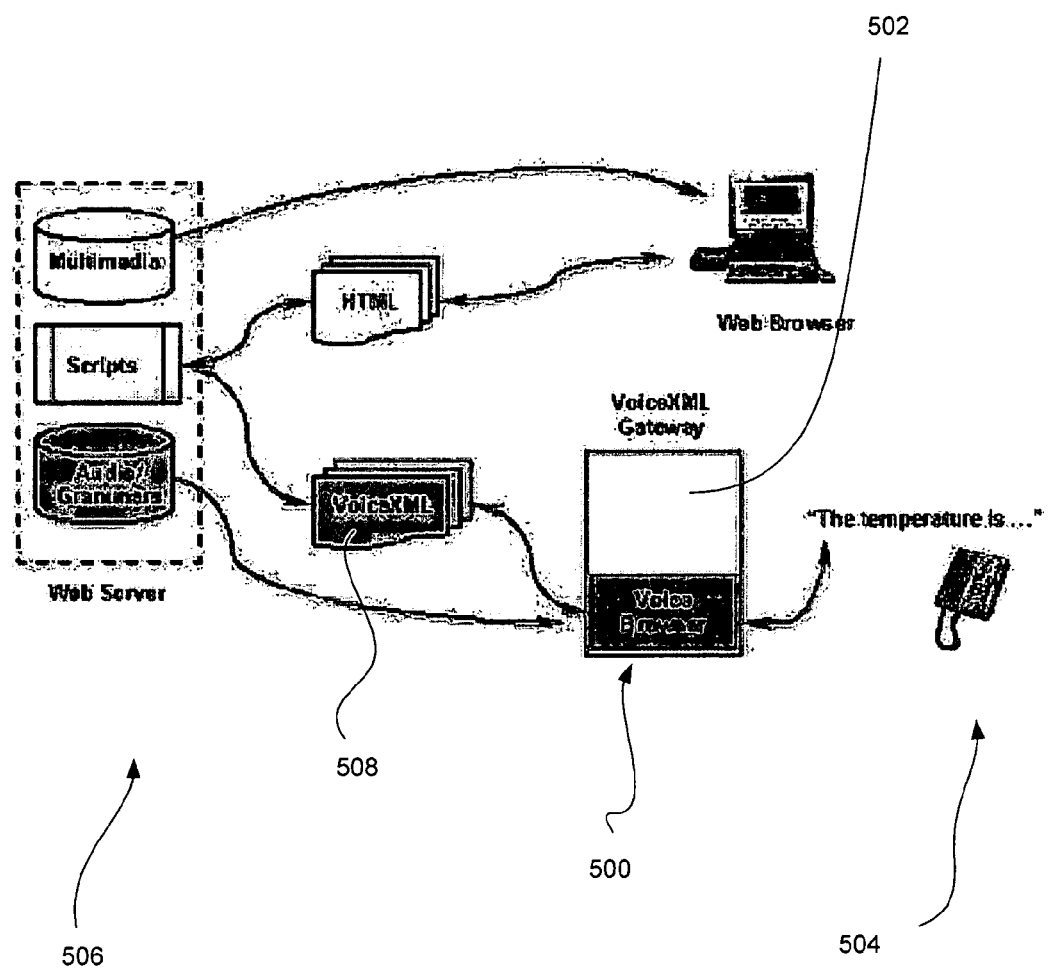
FIG. 5 is a schematic illustrating the manner in which VoiceXML functions, in accordance with one embodiment of the present invention.

FIG. 5 is a schematic illustrating the manner in which VoiceXML functions, in accordance with one embodiment of the present invention. A typical VoiceXML voice browser 500 of today runs on a specialized voice gateway node 502 that is connected both to the public switched telephone network 504 and to the Internet 506. As shown, VoiceXML 508 acts as an interface between the voice gateway node 502 and the Internet 506.

VoiceXML takes advantage of several trends:
 The growth of the World-Wide Web and of its capabilities.
 Improvements in computer-based speech recognition and text-to-speech synthesis.
 The spread of the WWW beyond the desktop computer.
 Voice application development is easier because VoiceXML is a high-level, domain-specific markup language, and because voice applications can now be constructed with plentiful, inexpensive, and powerful web application development tools.

VoiceXML is based on XML. XML is a general and highly flexible representation of any type of data, and various transformation technologies make it easy to map one XML structure to another, or to map XML into other data formats.

VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure in the following manner:

```
< element_name attribute_name="attribute_value">
......contained items......
< /element_name>
```

A VoiceXML application consists of one or more text files called documents. These document files are denoted by a ".vxml" file extension and contain the various VoiceXML instructions for the application. It is recommended that the first instruction in any document to be seen by the interpreter be the XML version tag:

```
< ?xml version="1.0"?>
```

The remainder of the document's instructions should be enclosed by the vxml tag with the version attribute set equal to the version of VoiceXML being used ("1.0" in the present case) as follows:

```
< vxml version="1.0">
```

Inside of the <vxml> tag, a document is broken up into discrete dialog elements called forms.

Each form has a name and is responsible for executing some portion of the dialog. For example, you may have a form called "mainMenu" that prompts the caller to make a selection from a list of options and then recognizes the response.

A form is denoted by the use of the <form> tag and can be specified by the inclusion of the id attribute to specify the form's name. This is useful if the form is to be referenced at some other point in the application or by another application. For example, <form id="welcome"> would indicate in a VoiceXML document the beginning of the "welcome" form.

Following is a list of form items available in one specification of VoiceXML:

field items:
  <field>—gathers input from the user via speech or DTMF recognition as defined by a grammar
  <record>—records an audio clip from the user
  <transfer>—transfers the user to another phone number
  <object>—invokes a platform-specific object that may gather user input, returning the result as an ECMAScript object
  <subdialog>—performs a call to another dialog or document (similar to a function call), returning the result as an ECMAScript object
control items:
  <block>—encloses a sequence of statements for prompting and computation
  <initial>—controls mixed-initiative interactions within a form Another preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small-scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling unregistered callers in a voice recognition framework, comprising:
   determining whether a user is registered;
   executing a registration process if it is determined that the user is not registered; and
   receiving and recognizing utterances representative of information from the user during the registration process, wherein the receiving is carried out utilizing an input device;
   wherein the information includes billing information;
   wherein the billing information is selected from the group consisting of a billing address and credit card data, where the billing address includes a city in which the user resides;
   wherein the information further includes at least one phone number of the user;
   wherein the determining whether a user is registered includes gathering information relating to the user from a first database and comparing the information against a second database of registered users;
   wherein directions are given to the user explaining the registration process and another process by which the user exits the registration process such that the user is capable of exiting the registration process at any time during the registration process upon receipt and detection of a predefined keyword uttered by the user;
   wherein the executing the registration process includes establishing a unique user account number for the user where the unique user account number is utilized for storing the information, and establishing a personal identification number for the user where the personal identification number is utilized for security purposes;
   wherein the registration process includes returning the user to a main menu after the registration process is complete or upon receipt and detection of the keyword;
   wherein the handling unregistered callers is managed by a platform including a presentation layer, an application logic layer, an information access services layer, and a telecom infrastructure;
   wherein the application logic layer includes a set of reusable application components and a software engine for the execution thereof, the application logic layer further including an application server, and a VoiceXML interpreter, the application server adapted for hosting logic of applications providing services, and the VoiceXML interpreter adapted for executing VoiceXML applications;
   wherein the presentation layer provides for communication with the user and includes a telephony server, a speech recognition server, and a text-to-speech server, the telephony server adapted for providing an interface for receiving voice streams from the user, the speech recognition server adapted for providing speech recognition of the voice streams provided by the telephony server, and the text-to-speech server adapted for transforming text input into audio output that is streamed through the telephony server to the user.

2. The method as recited in claim 1, wherein the information includes a gender of the user.

3. The method as recited in claim 1, wherein the information includes preferences.

4. The method as recited in claim 3, wherein the preferences are selected from the group consisting of personalization information, data relating to a stock portfolio of the user, and sports of interest to the user.

5. The method as recited in claim 3, wherein the preferences include personalization information, data relating to a stock portfolio of the user, and sports of interest to the user.

6. The method as recited in claim 1, wherein the information is entered by the user utilizing a computer coupled to a network.

7. The method as recited in claim 6, wherein the network includes the Internet.

8. The method as recited in claim 1, wherein the information is entered verbally utilizing a telephone by way of an attendant.

9. The method as recited in claim 1, wherein the information is used when providing the services.

10. The method as recited in claim 1, and further comprising presenting promotion information to the user during the registration process.

11. The method as recited in claim 1, wherein the executing the registration process includes receiving an account number that identifies a telecommunication carrier from which the user was transferred to the registration process.

12. The method as recited in claim 1, wherein the services are selected by the user and are chosen from the group consisting of a business finder service, a driving directions service, a flight information service, a traffic updates service, a weather service, a news service, a sports information service, a stock quote service and an infotainment service.

13. The method as recited in claim 1, wherein the information access services layer includes a content service, the content service adapted to manage the first database and the second database and to send alarms based on alarm conditions.

14. The method as recited in claim 1, wherein the information access services layer provides access to modular value-added services and includes at least one of a user profile service, a billing service, and a portal management service, the user profile service adapted to provide user information upon an authenticated request, the billing service adapted to capture and process billable events associated with the user, and the portal management service adapted to maintain the information on a voice portal associated with the user, where the voice portal is capable of being configured by the user to administer the applications providing the services that are selected by the user.

15. A computer program product embodied on a computer readable medium for handling unregistered callers in a voice recognition framework, comprising:
   computer code for determining whether a user is registered;
   computer code for executing a registration process if it is determined that the user is not registered; and
   computer code for receiving and recognizing utterances representative of information from the user during the registration process;
   wherein the information includes billing information;
   wherein the billing information is selected from the group consisting of a billing address and credit card data;
   wherein the information further includes at least one phone number of the user;
   wherein the determining whether a user is registered includes gathering information relating to the user from a first database and comparing the information against a second database of registered users;
   wherein directions are given to the user explaining the registration process;
   wherein the executing the registration process includes establishing a user account number for the user where the user account number is utilized in association with storing the information, and establishing a personal identification number for the user where the personal identification number is utilized for security purposes;
   wherein the handling unregistered callers is managed by a platform including a presentation layer, an application logic layer, an information access services layer, and a telecom infrastructure;
   wherein the application logic layer includes a set of reusable application components and a software engine for the execution thereof, the application logic layer further including an application component, and a VoiceXML interpreter, the application component adapted for hosting logic of applications providing services, and the VoiceXML interpreter adapted for executing VoiceXML applications;
   wherein the presentation layer provides for communication with the user and includes a telephony component, a speech recognition component, and a text-to-speech component, the telephony component adapted for providing an interface for receiving voice streams from the user, the speech recognition component adapted for providing speech recognition of the voice streams provided by the telephony component, and the text-to-speech component adapted for transforming text input into audio output that is streamed through the telephony component to the user.

16. A system including a computer program product embodied on a computer readable medium for handling unregistered callers in a voice recognition framework, comprising:
   a processor for executing a registration process if it is determined that a user is not registered; and
   an input device coupled to the processor for receiving utterances from the user;
   wherein the information includes billing information;
   wherein the billing information is selected from the group consisting of a billing address and credit card data, where the billing address includes a city in which the user resides;
   wherein the information further includes at least one phone number of the user;
   wherein the determining whether a user is registered includes gathering information relating to the user from a first database and comparing the information against a second database of registered users;
   wherein directions are given to the user explaining the registration process and another process by which the user exits the registration process such that the user is capable of exiting the registration process at any time during the registration process upon receipt and detection of a predefined keyword uttered by the user;
   wherein the executing the registration process includes establishing a unique user account number for the user where the unique user account number is utilized for storing the information, and establishing a personal identification number for the user where the personal identification number is utilized for security purposes;
   wherein the registration process includes returning the user to a main menu after the registration process is complete or upon receipt and detection of the keyword;
   wherein the handling unregistered callers is managed by a platform including a presentation layer, an application logic layer, an information access services layer, and a telecom infrastructure;
   wherein the application logic layer includes a set of reusable application components and a software engine for the execution thereof, the application logic layer further including an application server, and a VoiceXML interpreter, the application server adapted for hosting logic of applications providing services, and the VoiceXML interpreter adapted for executing VoiceXML applications;
   wherein the presentation layer provides for communication with the user and includes a telephony server, a speech recognition server, and a text-to-speech server, the telephony server adapted for providing an interface for receiving voice streams from the user, the speech recognition server adapted for providing speech recognition of the voice streams provided by the telephony server, and the text-to-speech server adapted for transforming text input into audio output that is streamed through the telephony server to the user.

17. The method as recited in claim 16, wherein the information relating to the user is gathered via call description records.

* * * * *